(12) United States Patent
Lin

(10) Patent No.: US 9,733,835 B2
(45) Date of Patent: Aug. 15, 2017

(54) DATA STORAGE METHOD AND STORAGE SERVER

(71) Applicant: Huawei Technologies Co., Ltd., Shenzhen (CN)

(72) Inventor: Dayun Lin, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/162,064

(22) Filed: May 23, 2016

(65) Prior Publication Data

US 2016/0266812 A1    Sep. 15, 2016

Related U.S. Application Data

(63) Continuation of application No. PCT/CN2014/075411, filed on Apr. 15, 2014.

(30) Foreign Application Priority Data

Nov. 26, 2013  (CN) .......................... 2013 1 0611665

(51) Int. Cl.
*G06F 3/06* (2006.01)
(52) U.S. Cl.
CPC .......... *G06F 3/0607* (2013.01); *G06F 3/0631* (2013.01); *G06F 3/0632* (2013.01);
(Continued)
(58) Field of Classification Search
CPC .... G06F 3/0607; G06F 3/0631; G06F 3/0632; G06F 3/0644; G06F 3/0647; G06F 3/0653; G06F 3/0689
(Continued)

(56) References Cited

U.S. PATENT DOCUMENTS 5,276,867 A    1/1994  Kenley et al.
8,082,393 B2 * 12/2011  Galloway ........... G06F 11/1076
                                                 711/114
8,140,753 B2 *  3/2012  Galloway ........... G06F 11/1076
                                                 711/114
(Continued)

FOREIGN PATENT DOCUMENTS

CN            1804777 A      7/2006
CN          101223498 A      7/2008
(Continued)

*Primary Examiner* — Stephen Elmore
(74) *Attorney, Agent, or Firm* — Slater Matsil, LLP

(57) ABSTRACT

Embodiments of the application disclose a data storage method and a storage server. The method includes: detecting actual usage of a hard disk corresponding to an initial capacity level in configured hard disk capacity levels; when it is determined, according to the detected actual usage, that the hard disk corresponding to the initial capacity level exceeds a limit, searching for a hard disk corresponding to a second highest capacity level and is higher than the initial capacity level; and when the hard disk corresponding to the second highest capacity level is obtained by searching, determining a migration ratio of a virtual node according to the initial capacity level, the second highest capacity level, and the actual hard disk capacity, and performing virtual node migration between hard disks that are corresponding to the configured hard disk capacity levels. By using the disclosure, hard disk capacity heterogeneousness in massive storage is supported.

17 Claims, 6 Drawing Sheets

(52) U.S. Cl.
CPC .......... *G06F 3/0644* (2013.01); *G06F 3/0647* (2013.01); *G06F 3/0653* (2013.01); *G06F 3/0689* (2013.01)

(58) Field of Classification Search
USPC ............ 711/112, 151, 154, 156, 171; 713/1; 718/104, 105
See application file for complete search history.

(56) References Cited

U.S. PATENT DOCUMENTS

| | | | | |
|---|---|---|---|---|
| 8,239,624 | B2* | 8/2012 | Galloway | ........... G06F 11/1076 711/114 |
| 8,316,180 | B2* | 11/2012 | Galloway | ........... G06F 11/1076 711/114 |
| 8,806,150 | B2* | 8/2014 | Nakajima | ............. G06F 3/0607 711/149 |
| 9,081,502 | B2* | 7/2015 | Nakajima | ............ H04L 67/1097 |
| 9,201,908 | B2* | 12/2015 | Soshin | ............... G06F 17/30292 |
| 9,361,039 | B2* | 6/2016 | Wang | ................... H04L 43/0817 |
| 9,465,560 | B2* | 10/2016 | Galloway | ........... G06F 11/1076 |
| 2005/0071560 | A1 | 3/2005 | Bolik | |
| 2006/0155950 | A1 | 7/2006 | Smith | |
| 2011/0060885 | A1 | 3/2011 | Satoyama et al. | |
| 2011/0208938 | A1 | 8/2011 | Carr et al. | |

FOREIGN PATENT DOCUMENTS

| | | |
|---|---|---|
| CN | 102968281 A | 3/2013 |
| CN | 103605484 A | 2/2014 |
| EP | 0992913 A1 | 4/2000 |

* cited by examiner

DATA STORAGE METHOD AND STORAGE SERVER

This application is a continuation of International Application No. PCT/CN2014/075411, filed on Apr. 15, 2014, which claims priority to Chinese Patent Application No. 201310611665.1, filed on Nov. 26, 2013, both of which are hereby incorporated by reference in their entireties.

TECHNICAL FIELD

The present invention relates to the data storage field, and in particular, to a data storage method and a storage server.

BACKGROUND

In a massively distributed storage system, objects are used as a basic storage form in most cases, where an object is a set of both data and self-descriptive information and is a basic storage unit for storing data in a disk, and a consistent hashing algorithm generally needs to be used to implement disperse distribution of these objects. Although the consistent hashing algorithm ensures balance, dispersibility, error tolerance, scalability, and the like for storage of system data, the consistent hashing algorithm does not ensure absolute balance. In particular, in a case in which there is a relatively small quantity of physical nodes, objects cannot be evenly mapped to the nodes. To solve this problem, the consistent hashing algorithm introduces a concept of a virtual node. The virtual node is a duplication of a physical node in annular space, and one physical node is corresponding to several virtual nodes. By increasing or expanding a quantity of virtual nodes, balance of the algorithm is greatly improved.

In the prior art, a massive storage system generally uses hard disks of a same capacity to establish a storage cluster and allocates virtual nodes of a same quantity to each physical node, so that the nodes maintain, to a greatest extent, a synchronous growth in terms of storage capacity. With the continuous development of a hard disk technology, a capacity of a single disk increases continuously, and the massive storage system inevitably faces a problem of hard disk capacity heterogeneous during expansion and parts replacement. However, a current storage solution cannot support hard disk capacity heterogeneousness in massive storage, thereby reducing use experience of a product.

SUMMARY

Embodiments of the present invention provide a data storage method and a storage server, which can support hard disk capacity heterogeneousness in massive storage.

According to a first aspect, the present invention provides a data storage method, including detecting actual usage of a hard disk corresponding to an initial capacity level in configured hard disk capacity levels, where the hard disk capacity levels are obtained by means of classification according to an actual hard disk capacity. When it is determined, according to the detected actual usage, that the hard disk corresponding to the initial capacity level exceeds a limit, searching for a hard disk corresponding to a second highest capacity level that is in the configured hard disk capacity levels and is higher than the initial capacity level. When the hard disk corresponding to the second highest capacity level is obtained by means of searching, determining a migration ratio of a virtual node according to the initial capacity level, the second highest capacity level, and the actual hard disk capacity, and performing, according to the migration ratio, virtual node migration between hard disks that are corresponding to the configured hard disk capacity levels, where the virtual node carries stored data.

In a first possible implementation manner, before the detecting actual usage of a hard disk corresponding to an initial capacity level in configured hard disk capacity levels, the method further includes during system initialization, allocating virtual nodes of a same quantity to the hard disks that are corresponding to the configured hard disk capacity levels; where the virtual node is used to manage the stored data.

With reference to the first aspect or the first possible implementation manner of the first aspect, in a second possible implementation manner, after the detecting actual usage of a hard disk corresponding to an initial capacity level in configured hard disk capacity levels, the method further includes detecting whether a quantity of hard disks that are corresponding to the initial capacity level and whose actual usage exceeds a preset usage threshold reaches a preset quantity threshold. If it is detected that the quantity of the hard disks reaches the quantity threshold, determining that the hard disk corresponding to the initial capacity level exceeds the limit.

With reference to the first aspect, or the first possible implementation manner of the first aspect, or the second possible implementation manner of the first aspect, in a third possible implementation manner, the step of when the hard disk corresponding to the second highest capacity level is obtained by means of searching, determining a migration ratio of a virtual node according to the initial capacity level, the second highest capacity level, and the actual hard disk capacity, and performing, according to the migration ratio, virtual node migration between hard disks that are corresponding to the configured hard disk capacity levels, where the virtual node carries stored data includes determining the migration ratio of the virtual node according to the initial capacity level, the second highest capacity level, and the actual hard disk capacity when the hard disk corresponding to the second highest capacity level is obtained by means of searching. The method further includes migrating, according to the migration ratio, the virtual node from a hard disk corresponding to a hard disk capacity level lower than the second highest capacity level to a hard disk corresponding to a hard disk capacity level higher than or equal to the second highest capacity level, where the virtual node carries the stored data.

With reference to the first aspect, or the first possible implementation manner of the first aspect, or the second possible implementation manner of the first aspect, or the third possible implementation manner of the first aspect, in a fourth possible implementation manner, the method further includes sending expansion prompt information when the second highest capacity level that is in the configured hard disk capacity levels and is higher than the initial capacity level is not obtained by means of searching.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, the method further includes sending the expansion prompt information when the hard disk corresponding to the second highest capacity level exceeds a limit and the second highest capacity level is a highest hard disk capacity level in the configured levels.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner, the method further includes setting a corresponding hard disk capacity level for a newly added or replaced hard disk during expansion or hard disk replacement, so as to perform the virtual node migration between the hard disks that are corresponding to the configured hard disk capacity levels.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, in a seventh possible implementation manner, the method further includes marking the hard disk capacity level that is lower than the ratio threshold when it is detected that a ratio of a quantity of hard disks corresponding to a configured hard disk capacity level to a total quantity of hard disks is less than a ratio threshold. The method further includes updating the marked hard disk capacity level, so as to improve data migration performance.

According to a second aspect, the present invention provides a storage server, including a usage detecting module, configured to detect actual usage of a hard disk corresponding to an initial capacity level in configured hard disk capacity levels, where the hard disk capacity levels are obtained by means of classification according to an actual hard disk capacity. A searching module is configured to: when it is determined, according to the actual usage detected by the usage detecting module, that the hard disk corresponding to the initial capacity level exceeds a limit, searching for a hard disk corresponding to a second highest capacity level that is in the configured hard disk capacity levels and is higher than the initial capacity level. A migration determining module is configured to: when the hard disk corresponding to the second highest capacity level is obtained by means of searching by the searching module, determine a migration ratio of a virtual node according to the initial capacity level, the second highest capacity level, and the actual hard disk capacity, and perform, according to the migration ratio, virtual node migration between hard disks that are corresponding to the configured hard disk capacity levels, where the virtual node carries stored data.

In a first possible implementation manner, the storage server further includes an allocating module, configured to: during system initialization, allocate virtual nodes of a same quantity to the hard disks that are corresponding to the configured hard disk capacity levels; where the virtual node is used to manage the stored data.

With reference to the second aspect or the first possible implementation manner of the second aspect, in a second possible implementation manner, the storage server further includes a quantity detecting module, configured to: detect whether a quantity of hard disks that are corresponding to the initial capacity level and whose actual usage exceeds a preset usage threshold reaches a preset quantity threshold; and a determining module, configured to: if it is detected that the quantity of the hard disks reaches the quantity threshold, determine that the hard disk corresponding to the initial capacity level exceeds the limit.

With reference to the second aspect, or the first possible implementation manner of the second aspect, or the second possible implementation manner of the second aspect, in a third possible implementation manner, the migration determining module includes a ratio determining unit, configured to determine the migration ratio of the virtual node according to the initial capacity level, the second highest capacity level, and the actual hard disk capacity when the hard disk corresponding to the second highest capacity level is obtained by means of searching by the searching module. A migrating unit is configured to migrate, according to the migration ratio, the virtual node from a hard disk corresponding to a hard disk capacity level lower than the second highest capacity level to a hard disk corresponding to a hard disk capacity level higher than or equal to the second highest capacity level, where the virtual node carries the stored data.

With reference to the second aspect, or the first possible implementation manner of the second aspect, or the second possible implementation manner of the second aspect, or the third possible implementation manner of the second aspect, in a fourth possible implementation manner, the storage server further includes a first sending module, configured to: when the second highest capacity level that is in the configured hard disk capacity levels and is higher than the initial capacity level is not obtained by means of searching, send expansion prompt information.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, the storage server further includes a second sending module, configured to: when the hard disk corresponding to the second highest capacity level exceeds a limit and the second highest capacity level is a highest hard disk capacity level in the configured levels, send the expansion prompt information.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, in a sixth possible implementation manner, the storage server further includes a setting module, configured to: during expansion or hard disk replacement, set a corresponding hard disk capacity level for a newly added or replaced hard disk, so as to perform the virtual node migration between the hard disks that are corresponding to the configured hard disk capacity levels.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, in a seventh possible implementation manner, the storage server further includes a marking module, configured to: when it is detected that a ratio of a quantity of hard disks corresponding to a configured hard disk capacity level to a total quantity of hard disks is less than a ratio threshold, mark the hard disk capacity level that is lower than the ratio threshold. An updating module is configured to update the marked hard disk capacity level, so as to improve data migration performance.

According to the embodiments of the present invention, different hard disk capacity levels are obtained by means of classification according to an actual hard disk capacity, and when a hard disk corresponding to an initial capacity level exceeds a limit, a virtual node that is on each hard disk and carries stored data is migrated, so that hard disk capacity heterogeneousness in massive storage can be supported, and meanwhile, storage space of hard disks of different capacities can also be adequately used because data on a virtual node is migrated according to a migration ratio.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

Figure 1:
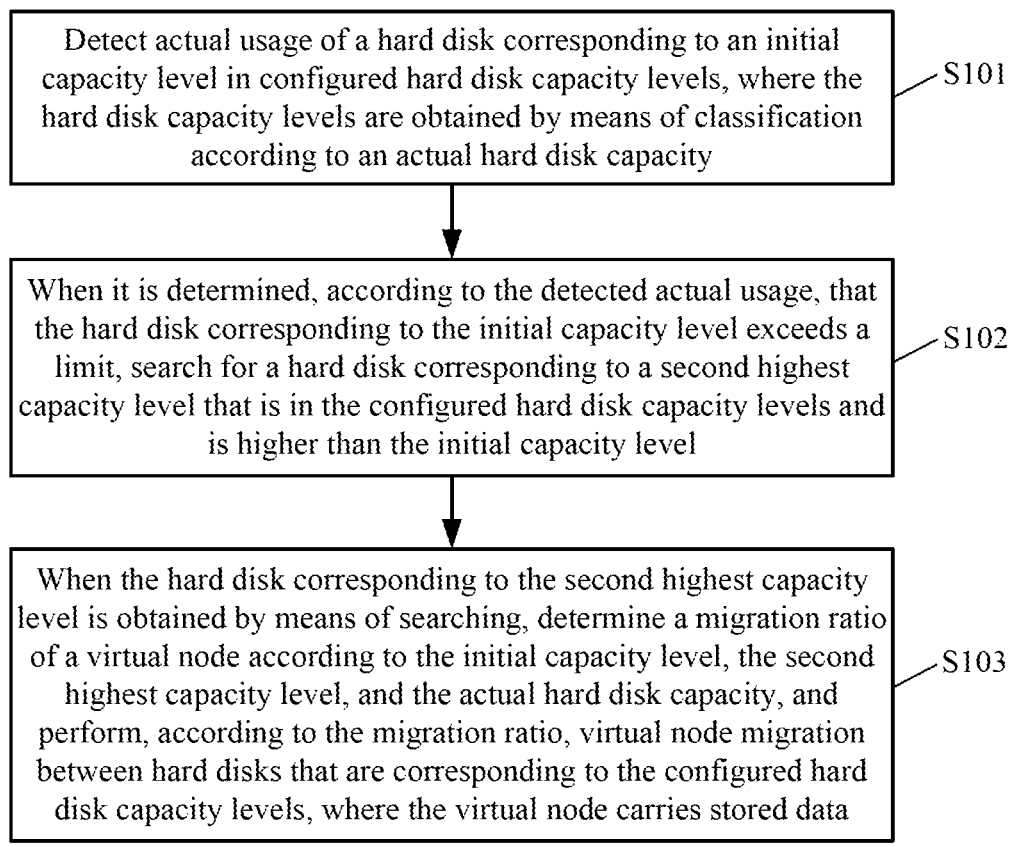
FIG. 1 is a schematic flowchart of a data storage method according to an embodiment of the present invention.

Referring to FIG. 1, FIG. 1 is a schematic flowchart of a data storage method according to an embodiment of the present invention, where the method includes:

S101. Detect actual usage of a hard disk corresponding to an initial capacity level in configured hard disk capacity levels, where the hard disk capacity levels are obtained by means of classification according to an actual hard disk capacity.

Specifically, the hard disk capacity levels are obtained by means of classification according to the actual hard disk capacity. For example, there are hard disks of three capacities, that is, 1 TB, 2 TB, and 3 TB in a distributed storage system; then, a hard disk capacity level of a hard disk of capacity 1 TB is configured to a level 1, a hard disk capacity level of a hard disk of capacity 2 TB is configured to a level 2, and a hard disk capacity level of a hard disk of capacity 3 TB is configured to a level 3. The initial capacity level is selected from the configured hard disk capacity levels. For example, during system initialization, a minimum hard disk capacity level is selected from the configured hard disk capacity levels as the initial capacity level, that is, in hard disk capacity levels, that is, the level 1 to the level 3, the hard disk capacity level, that is, the level 1, is selected as the initial capacity level. After the initial capacity level is determined, the actual usage of the hard disk corresponding to the initial capacity level in the configured hard disk capacity levels may be detected. For example, if the initial capacity level is the hard disk capacity level, that is, the level 1, a capacity of stored data in a hard disk corresponding to the hard disk capacity level, that is, the level 1, is detected. The hard disk may be a solid state hard disk, a mechanical hard disk, a hybrid hard disk, or the like.

S102. When it is determined, according to the detected actual usage, that the hard disk corresponding to the initial capacity level exceeds a limit, search for a hard disk corresponding to a second highest capacity level that is in the configured hard disk capacity levels and is higher than the initial capacity level.

Specifically, it may be detected, according to the detected actual usage, whether the hard disk corresponding to the initial capacity level exceeds the limit. For example, the initial capacity level is the hard disk capacity level, that is, the level 1, and a quantity of hard disks corresponding to the hard disk capacity level, that is, the level 1, is 10; and when it is detected that a quantity of hard disks whose actual usage exceeds 50% of a hard disk capacity reaches 8, it may be determined that the hard disks corresponding to the initial capacity level exceed the limit. When it is determined, according to the detected actual usage, that the hard disk corresponding to the initial capacity level exceeds the limit, the hard disk corresponding to the second highest capacity level that is in the configured hard disk capacity levels and is higher than the initial capacity level may be searched for. For example, when hard disks in a storage system may be classified into a level 1, a level 2, and a level 3, and the initial capacity level is a hard disk capacity level, that is, the level 1, the hard disk corresponding to the second highest capacity level that is in the configured hard disk capacity levels and is higher than the initial capacity level may be obtained by means of searching, that is, a hard disk corresponding to the second highest capacity level that is a hard disk capacity level, that is, the level 2.

S103. When the hard disk corresponding to the second highest capacity level is obtained by means of searching, determine a migration ratio of a virtual node according to the initial capacity level, the second highest capacity level, and the actual hard disk capacity, and perform, according to the migration ratio, virtual node migration between hard disks that are corresponding to the configured hard disk capacity levels, where the virtual node carries stored data.

Specifically, when the hard disk corresponding to the second highest capacity level is obtained by means of searching, the migration ratio of the virtual node may be determined according to the initial capacity level, the second highest capacity level, and the actual hard disk capacity, and virtual node migration between the hard disks that are corresponding to the configured hard disk capacity levels may be performed according to the migration ratio, where the virtual node carries the stored data. That is, a virtual node that is on a hard disk of a low hard disk capacity level and carries the stored data is migrated to a hard disk of a high hard disk capacity level, so that the virtual node and data stored on the virtual node may be migrated at the same time. The migrated data may still be mapped to the original corresponding virtual node, so that the migrated data may continue to be normally stored and retrieved. The virtual node on the hard disk of the low hard disk capacity level and the data stored on the virtual node are migrated to the hard disk of the high hard disk capacity level, which can reduce storage load of the hard disk of the low hard disk capacity level and adequately use storage space of the hard disk of the high hard disk capacity level. In addition, the hard disk of the high hard disk capacity level may have more virtual nodes to share more storage work, so that performance balance can be improved, and further, storage space of a hard disk of a large capacity can be adequately used.

For example, hard disk capacity levels in a storage system include a level 1, a level 2, and a level 3, actual hard disk capacities are respectively 1 TB, 2 TB, and 3 TB, and quantities of hard disks corresponding to the hard disk capacity levels are the same. During system initialization, 48 virtual nodes are allocated to hard disks corresponding to each hard disk capacity level, and the initial capacity level is a hard disk capacity level, that is, the level 1. When hard disks corresponding to the initial capacity level exceed a limit, a hard disk capacity level, that is, the level 2, is used as the second highest capacity level, and the migration ratio of the virtual node is determined according to the initial capacity level and the second highest capacity level, that is, a migration ratio of hard disks that are corresponding to the hard disk capacity levels, that is, the level 1, the level 2, and the level 3, is 1:2:2. A quantity of virtual nodes that are obtained by a hard disk of a hard disk capability level higher than the second highest capacity level is the same as a quantity of virtual nodes that are obtained by the hard disk of the second highest capacity level. In this case, virtual nodes on the hard disks corresponding to the level 1 are migrated to the hard disks of the level 2 and the level 3 according to the migration ratio of 1:2:2. Because each virtual node carries data of a same size, after the virtual node migration ends, a size ratio of data that is stored in the hard disks corresponding to the level 1, the level 2, and the level 3 is also 1:2:2. In this case, a quantity of virtual nodes on the hard disks corresponding to the level 1 is 29, a quantity of virtual nodes on the hard disks corresponding to the level 2 is 57, and a quantity of virtual nodes on the hard disks corresponding to the level 3 is 58. After the virtual node migration is completed, the second highest capacity level may also be used as the initial capacity level to perform virtual node migration, that is, when the hard disks corresponding to the hard disk capacity level, that is, the level 2, exceed a limit, it is determined that a migration ratio of virtual nodes of the hard disks of the level 1 to the level 3 is 1:2:3. After the virtual node migration ends, the ratios of the size of the data that is stored on the hard disks corresponding to the level 1 to the level 3 and the quantity of the virtual nodes are both 1:2:3, that is, a quantity of the virtual nodes on the hard disks corresponding to the level 1 is 24, a quantity of the virtual nodes on the hard disks corresponding to the level 2 is 48, and a quantity of the virtual nodes on the hard disks corresponding to the level 3 is 64.

For another example, hard disk capacity levels in a storage system include a level 1, a level 2, and a level 3, actual hard disk capacities are respectively 1 TB, 2 TB, and 3 TB, and quantities of hard disks corresponding to the hard disk capacity levels are different. A quantity of hard disks corresponding to the level 1 is 20, a quantity of hard disks corresponding to the level 2 is 30, and a quantity of hard disks corresponding to the level 3 is 40. During system initialization, 48 virtual nodes are allocated to the hard disks corresponding to each hard disk capacity level. When the hard disks corresponding to the level 1 exceed a limit and the level 2 is the second highest capacity level, the migration ratio is still 1:2:2. After the virtual node migration ends, a quantity of virtual nodes on the hard disks corresponding to the level 1 is 27, a quantity of virtual nodes on the hard disks corresponding to the level 2 is 54, and a quantity of virtual nodes on the hard disks corresponding to the level 3 is 54.

For another example, hard disk capacity levels in a storage system include a level 1, a level 2, and a level 3. If a hard disk capacity corresponding to the level 1 is 1.5 TB, a hard disk capacity corresponding to the level 2 is 2.5 TB, a hard disk capacity corresponding to the level 3 is 3.5 TB, hard disks corresponding to the level 1 exceed a limit, and the level 2 is the second highest capacity level, in this case, the migration ratio that is determined according to the actual hard disk capacity is 1.5:2.5:2.5.

According to this embodiment of the present invention, different hard disk capacity levels are obtained by means of classification according to an actual hard disk capacity, and when a hard disk corresponding to an initial capacity level exceeds a limit, a virtual node that is on each hard disk and carries stored data is migrated, so that hard disk capacity heterogeneousness in massive storage can be supported, and meanwhile, storage space of hard disks of different capacities can also be adequately used because data on a virtual node is migrated according to a migration ratio. In addition, a hard disk of a high level may have more virtual nodes to share more storage work, so that performance balance can be improved, and further, storage space of a hard disk of a large capacity can be adequately used.

Figure 2:
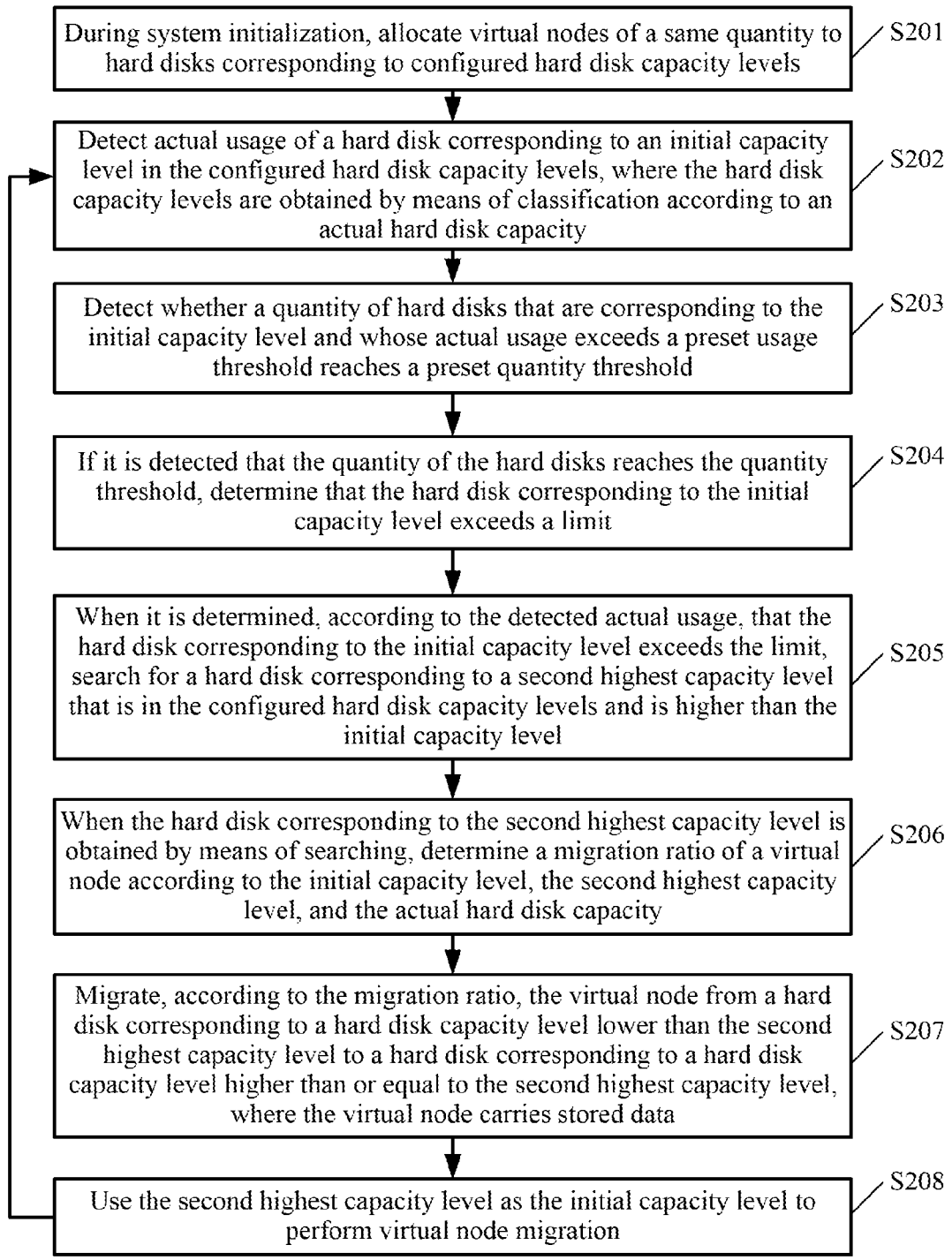
FIG. 2 is a schematic flowchart of another data storage method according to an embodiment of the present invention.

Referring to FIG. 2, FIG. 2 is a schematic flowchart of another data storage method according to an embodiment of the present invention, where the method includes:

S201. During system initialization, allocate virtual nodes of a same quantity to hard disks corresponding to configured hard disk capacity levels.

Specifically, during the system initialization, the virtual nodes of the same quantity are allocated to the hard disks corresponding to the configured hard disk capacity levels, so that data interfaces between heterogeneous hard disks are balanced among nodes to a greatest extent. The virtual node is used to manage stored data.

S202. Detect actual usage of a hard disk corresponding to an initial capacity level in the configured hard disk capacity levels, where the hard disk capacity levels are obtained by means of classification according to an actual hard disk capacity.

Specifically, the hard disk capacity levels are obtained by means of classification according to the actual hard disk capacity. For example, there are hard disks of three capacities, that is, 1 TB, 2 TB, and 3 TB in a distributed storage system; then, a hard disk capacity level of a hard disk of capacity 1 TB is configured to a level 1, a hard disk capacity level of a hard disk of capacity 2 TB is configured to a level 2, and a hard disk capacity level of a hard disk of capacity 3 TB is configured to a level 3. The initial capacity level is selected from the configured hard disk capacity levels. For example, during the system initialization, a minimum hard disk capacity level is selected from the configured hard disk capacity levels as the initial capacity level, that is, in hard disk capacity levels, that is, the level 1 to the level 3, the hard disk capacity level, that is, the level 1, is selected as the initial capacity level. After the initial capacity level is determined, the actual usage of the hard disk corresponding to the initial capacity level in the configured hard disk capacity levels may be detected. For example, if the initial capacity level is the hard disk capacity level, that is, the level 1, a capacity of stored data in a hard disk corresponding to the hard disk capacity level, that is, the level 1, is detected.

S203. Detect whether a quantity of hard disks that are corresponding to the initial capacity level and whose actual usage exceeds a preset usage threshold reaches a preset quantity threshold.

S204. If it is detected that the quantity of the hard disks reaches the quantity threshold, determine that the hard disk corresponding to the initial capacity level exceeds a limit.

When it is detected that the quantity of the hard disks that are corresponding to the initial capacity level and whose actual usage exceeds the preset usage threshold reaches the preset quantity threshold, it is determined that the hard disk corresponding to the initial capacity level exceeds the limit. For example, the initial capacity level is the hard disk capacity level, that is, the level 1, a quantity of hard disks corresponding to the hard disk capacity level, that is, the level 1, is 10, the usage threshold is 50% of a hard disk capacity, and the quantity threshold is 80% of a quantity of hard disks that are corresponding to a hard disk capacity level; and when it is detected that a quantity of hard disks whose actual usage exceeds 50% of the hard disk capacity reaches 8, it may be determined that the hard disk corresponding to the initial capacity level exceeds the limit.

S205. When it is determined, according to the detected actual usage, that the hard disk corresponding to the initial capacity level exceeds the limit, search for a hard disk corresponding to a second highest capacity level that is in the configured hard disk capacity levels and is higher than the initial capacity level.

When it is determined, according to the detected actual usage, that the hard disk corresponding to the initial capacity level exceeds the limit, the hard disk corresponding to the second highest capacity level that is in the configured hard disk capacity levels and is higher than the initial capacity level may be searched for. For example, when hard disks in a storage system may be classified into a level 1, a level 2, and a level 3, and the initial capacity level is a hard disk capacity level, that is, the level 1, the hard disk corresponding to the second highest capacity level that is in the configured hard disk capacity levels and is higher than the initial capacity level may be obtained by means of searching, that is, a hard disk corresponding to the second highest capacity level that is a hard disk capacity level, that is, the level 2.

S206. When the hard disk corresponding to the second highest capacity level is obtained by means of searching, determine a migration ratio of a virtual node according to the initial capacity level, the second highest capacity level, and the actual hard disk capacity.

S207. Migrate, according to the migration ratio, the virtual node from a hard disk corresponding to a hard disk capacity level lower than the second highest capacity level to a hard disk corresponding to a hard disk capacity level higher than or equal to the second highest capacity level, where the virtual node carries the stored data.

S208. Use the second highest capacity level as the initial capacity level to perform virtual node migration.

Specifically, when the hard disk corresponding to the second highest capacity level is obtained by means of searching, the migration ratio of the virtual node may be determined according to the initial capacity level, the second highest capacity level, and the actual hard disk capacity, and virtual node migration between the hard disks that are corresponding to the configured hard disk capacity levels may be performed according to the migration ratio, where the virtual node carries the stored data. That is, a virtual node that is on a hard disk of a low hard disk capacity level and carries the stored data is migrated to a hard disk of a high hard disk capacity level, so that the virtual node and data stored on the virtual node may be migrated at the same time. The migrated data may still be mapped to the original corresponding virtual node, so that the migrated data may continue to be normally stored and retrieved. The virtual node on the hard disk of the low hard disk capacity level and the data stored on the virtual node are migrated to the hard disk of the high hard disk capacity level, which can reduce storage load of the hard disk of the low hard disk capacity level and adequately use storage space of the hard disk of the high hard disk capacity level. In addition, the hard disk of the high hard disk capacity level may have more virtual nodes to share more storage work, so that performance balance can be improved, and further, storage space of a hard disk of a large capacity can be adequately used.

For example, hard disk capacity levels in a storage system include a level 1, a level 2, and a level 3, actual hard disk capacities are respectively 1 TB, 2 TB, and 3 TB, and quantities of hard disks corresponding to the hard disk capacity levels are the same. During the system initialization, 48 virtual nodes are allocated to hard disks corresponding to each hard disk capacity level, and the initial capacity level is a hard disk capacity level, that is, the level 1. When hard disks corresponding to the initial capacity level exceed a limit, a hard disk capacity level, that is, the level 2, is used as the second highest capacity level, and the migration ratio of the virtual node is determined according to the initial capacity level and the second highest capacity level, that is, a migration ratio of hard disks that are corresponding to the hard disk capacity levels, that is, the level 1, the level 2, and the level 3, is 1:2:2. A quantity of virtual nodes that are obtained by a hard disk of a hard disk capability level higher than the second highest capacity level is the same as a quantity of virtual nodes that are obtained by the hard disk of the second highest capacity level. In this case, virtual nodes on the hard disks corresponding to the level 1 are migrated to the hard disks of the level 2 and the level 3 according to the migration ratio of 1:2:2. Because each virtual node carries data of a same size, after the virtual node migration ends, a size ratio of data that is stored in the hard disks corresponding to the level 1, the level 2, and the level 3 is also 1:2:2. In this case, a quantity of virtual nodes on the hard disks corresponding to the level 1 is 29, a quantity of virtual nodes on the hard disks corresponding to the level 2 is 57, and a quantity of virtual nodes on the hard disks corresponding to the level 3 is 58. After the virtual node migration is completed, the second highest capacity level may also be used as the initial capacity level to perform virtual node migration, that is, when the hard disks corresponding to the hard disk capacity level, that is, the level 2, exceed a limit, it is determined that a migration ratio of virtual nodes of the hard disks of the level 1 to the level 3 is 1:2:3. After the virtual node migration ends, the ratios of the size of the data that is stored on the hard disks corresponding to the level 1 to the level 3 and the quantity of the virtual nodes are both 1:2:3, that is, a quantity of the virtual nodes on the hard disks corresponding to the level 1 is 24, a quantity of the virtual nodes on the hard disks corresponding to the level 2 is 48, and a quantity of the virtual nodes on the hard disks corresponding to the level 3 is 64.

For another example, hard disk capacity levels in a storage system include a level 1, a level 2, and a level 3, actual hard disk capacities are respectively 1 TB, 2 TB, and 3 TB, and quantities of hard disks corresponding to the hard disk capacity levels are different. A quantity of hard disks corresponding to the level 1 is 20, a quantity of hard disks corresponding to the level 2 is 30, and a quantity of hard disks corresponding to the level 3 is 40. During the system initialization, 48 virtual nodes are allocated to the hard disks corresponding to each hard disk capacity level. When the hard disks corresponding to the level 1 exceed a limit and the level 2 is the second highest capacity level, the migration ratio is still 1:2:2. After the virtual node migration ends, a quantity of virtual nodes on the hard disks corresponding to the level 1 is 27, a quantity of virtual nodes on the hard disks corresponding to the level 2 is 54, and a quantity of virtual nodes on the hard disk corresponding to the level 3 is 54.

For another example, hard disk capacity levels in a storage system include a level 1, a level 2, and a level 3. If a hard disk capacity corresponding to the level 1 is 1.5 TB, a hard disk capacity corresponding to the level 2 is 2.5 TB, a hard disk capacity corresponding to the level 3 is 3.5 TB, hard disks corresponding to the level 1 exceed a limit, and the level 2 is the second highest capacity level, in this case, the migration ratio that is determined according to the actual hard disk capacity is 1.5:2.5:2.5.

According to this embodiment of the present invention, different hard disk capacity levels are obtained by means of classification according to an actual hard disk capacity, and when a hard disk corresponding to an initial capacity level exceeds a limit, a virtual node that is on each hard disk and carries stored data is migrated, so that hard disk capacity heterogeneousness in massive storage can be supported, and meanwhile, storage space of hard disks of different capacities can also be adequately used because data on a virtual node is migrated according to a migration ratio. In addition, a hard disk of a high level may have more virtual nodes to share more storage work, so that performance balance can be improved, and further, storage space of a hard disk of a large capacity can be adequately used.

Figure 3:
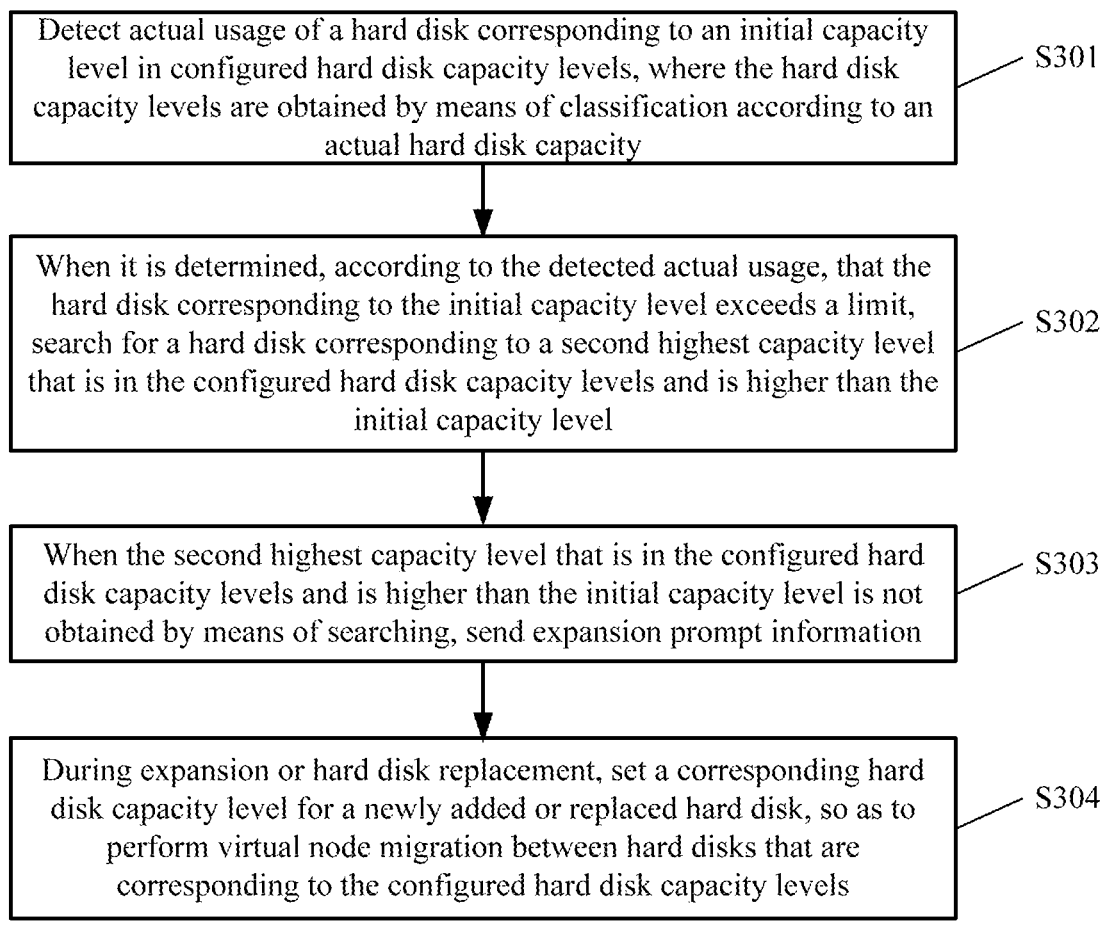
FIG. 3 is a schematic flowchart of still another data storage method according to an embodiment of the present invention.

Referring to FIG. 3, FIG. 3 is a schematic flowchart of still another data storage method according to an embodiment of the present invention, where the method includes:

S301. Detect actual usage of a hard disk corresponding to an initial capacity level in configured hard disk capacity levels, where the hard disk capacity levels are obtained by means of classification according to an actual hard disk capacity.

S302. When it is determined, according to the detected actual usage, that the hard disk corresponding to the initial capacity level exceeds a limit, search for a hard disk corresponding to a second highest capacity level that is in the configured hard disk capacity levels and is higher than the initial capacity level.

S303. When the second highest capacity level that is in the configured hard disk capacity levels and is higher than the initial capacity level is not obtained by means of searching, send expansion prompt information.

Specifically, when the second highest capacity level that is in the configured hard disk capacity levels and is higher than the initial capacity level is not obtained by means of searching, it indicates that the hard disk corresponding to the initial capacity level is a highest level in the hard disk capacity levels. To enable a storage system to continue to store data, expansion may be performed, that is, the expansion prompt information may be sent to a terminal of an administrator, so as to prompt the administrator to expand a capacity of the storage system.

S304. During expansion or hard disk replacement, set a corresponding hard disk capacity level for a newly added or replaced hard disk, so as to perform virtual node migration between hard disks that are corresponding to the configured hard disk capacity levels.

Specifically, during the expansion or the hard disk replacement, the corresponding hard disk capacity level is set for the newly added or the replaced hard disk, so as to perform the virtual node migration between the hard disks that are corresponding to the configured hard disk capacity levels. For example, in a storage system, there are hard disks of capacities, that is, 1 TB, 2 TB, and 3 TB, where corresponding hard disk capacity levels of the hard disks are respectively a level 1, a level 2, and a level 3. Actual capacities of the hard disks are respectively 1 TB, 2 TB, and 3 TB, and a current initial capacity level is a hard disk capacity level, that is, the level 3. When hard disks corresponding to the initial capacity level exceed a limit and a hard disk of capacity 4 TB is added, the hard disk of capacity 4 TB is set to a hard disk capacity level, that is, a level 4, and virtual node migration between hard disks that are corresponding to the hard disk capacity levels, that is, the level 1 to the level 4, is performed according to a migration ratio of 1:2:3:4. When hard disks corresponding to the initial capacity level do not exceed a limit and a hard disk of capacity 4 TB is added, the hard disk of capacity 4 TB is set to a hard disk capacity level, that is, a level 4, and virtual node migration between hard disks that are corresponding to the hard disk capacity levels, that is, the level 1 to the level 4, is performed according to a migration ratio of 1:2:3:3. During the expansion and the hard disk replacement, migration of a virtual node that carries stored data may enable the storage system to continue to normally store data.

For specific implementation manners of steps S301 to S302, reference may be made to specific implementation manners of S101 to S102 in the foregoing embodiment corresponding to FIG. 1, and details are not described herein again.

According to this embodiment of the present invention, by sending expansion prompt information, a capacity of a storage system may be expanded. During expansion or hard disk replacement, a corresponding hard disk capacity level is set for a newly added or replaced hard disk, so as to perform virtual node migration between hard disks that are corresponding to configured hard disk capacity levels, so that the storage system whose capacity has been expanded may still adequately use storage space of hard disks of different capacities, and meanwhile, performance balance may also be considered.

Figure 4:
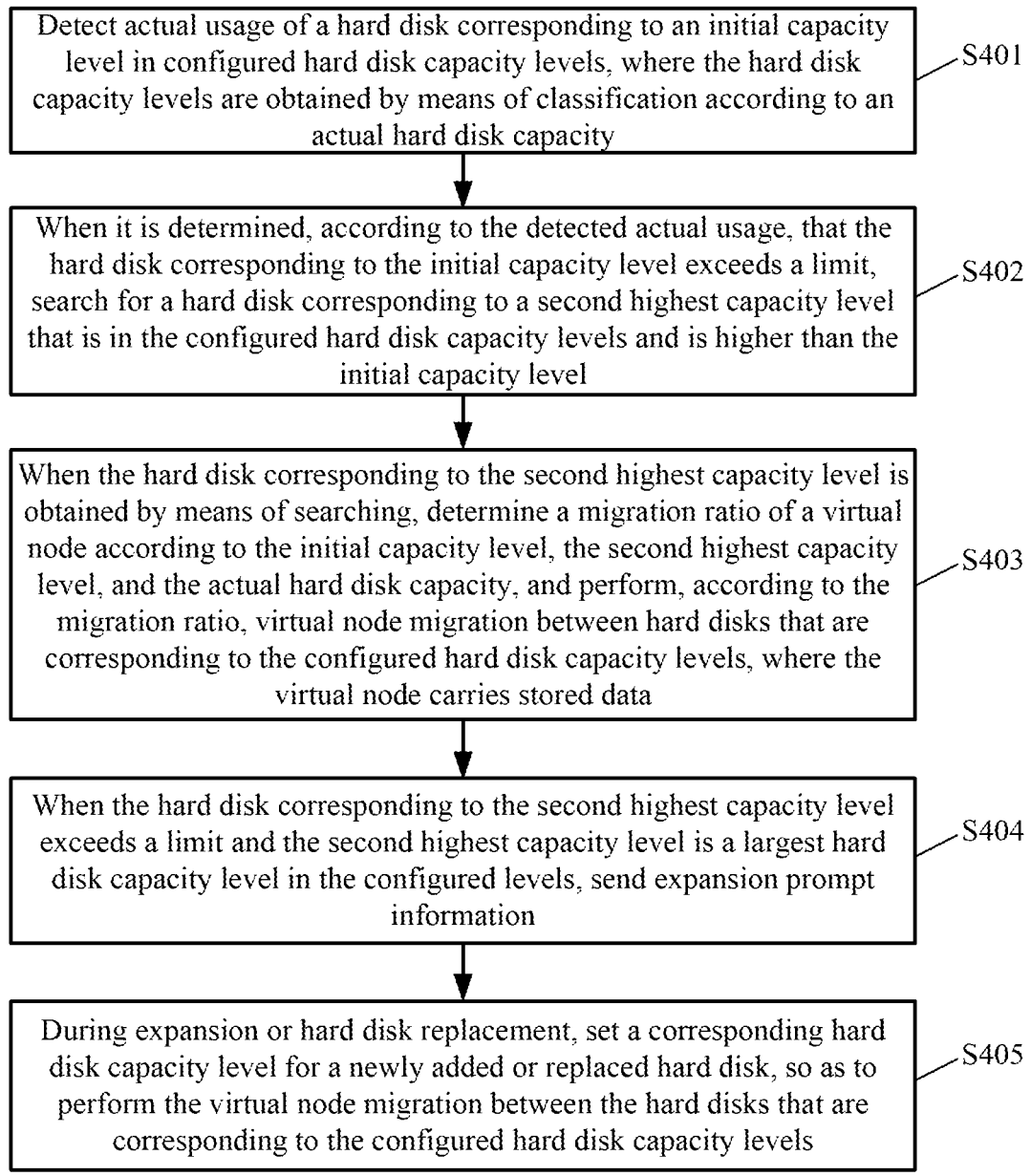
FIG. 4 is a schematic flowchart of yet another data storage method according to an embodiment of the present invention.

Referring to FIG. 4, FIG. 4 is a schematic flowchart of yet another data storage method according to an embodiment of the present invention, where the method includes:

S401. Detect actual usage of a hard disk corresponding to an initial capacity level in configured hard disk capacity levels, where the hard disk capacity levels are obtained by means of classification according to an actual hard disk capacity.

S402. When it is determined, according to the detected actual usage, that the hard disk corresponding to the initial capacity level exceeds a limit, search for a hard disk corresponding to a second highest capacity level that is in the configured hard disk capacity levels and is higher than the initial capacity level.

S403. When the hard disk corresponding to the second highest capacity level is obtained by means of searching, determine a migration ratio of a virtual node according to the initial capacity level, the second highest capacity level, and the actual hard disk capacity, and perform, according to the migration ratio, virtual node migration between hard disks that are corresponding to the configured hard disk capacity levels, where the virtual node carries stored data.

S404. When the hard disk corresponding to the second highest capacity level exceeds a limit and the second highest capacity level is a highest hard disk capacity level in the configured levels, send expansion prompt information.

Specifically, when the hard disk corresponding to the second highest capacity level exceeds the limit and the second highest capacity level is not the highest hard disk capacity level in the configured levels, the second highest capacity level may be used as the initial capacity level to perform virtual node migration. When the hard disk corresponding to the second highest capacity level exceeds the limit and the second highest capacity level is the highest hard disk capacity level in the configured levels, it indicates that in a storage system, a hard disk corresponding to a hard disk capacity level higher than the second highest capacity level does not exist. To enable the storage system to continue to normally work, expansion is required, that is, the expansion prompt information may be sent to a terminal of an administrator, so as to prompt the administrator to expand a capacity of the storage system.

S405. During expansion or hard disk replacement, set a corresponding hard disk capacity level for a newly added or replaced hard disk, so as to perform the virtual node migration between the hard disks that are corresponding to the configured hard disk capacity levels.

Specifically, during the expansion or the hard disk replacement, the corresponding hard disk capacity level is set for the newly added or the replaced hard disk, so as to perform the virtual node migration between the hard disks that are corresponding to the configured hard disk capacity levels. For example, in a storage system, there are hard disks of capacities, that is 1 TB, 2 TB, and 3 TB, where corresponding hard disk capacity levels of the hard disks are respectively a level 1, a level 2, and a level 3, and a current initial capacity level is a hard disk capacity level, that is, the level 3. When hard disks corresponding to the initial capacity level exceed a limit and a hard disk of capacity 4 TB is added, the hard disk of capacity 4 TB is set to a hard disk capacity level, that is, a level 4, and virtual node migration between the hard disks that are corresponding to the hard disk capacity levels, that is, the level 1 to the level 4, is performed according to a migration ratio of 1:2:3:4. When hard disks corresponding to the initial capacity level do not exceed a limit and a hard disk of capacity 4 TB is added, the hard disk of capacity 4 TB is set to a hard disk capacity level, that is, a level 4, and virtual node migration between the hard disks that are corresponding to the hard disk capacity levels, that is, the level 1 to the level 4, is performed according to a migration ratio of 1:2:3:3. During the expansion and the hard disk replacement, migration of a virtual node that carries stored data may enable the storage system to continue to normally store data.

For specific implementation manners of steps S401 to S403, reference may be made to specific implementation manners of S101 to S103 in the foregoing embodiment corresponding to FIG. 1, and details are not described herein again.

According to this embodiment of the present invention, by sending expansion prompt information, a capacity of a storage system may be expanded. During expansion or hard disk replacement, a corresponding hard disk capacity level is set for a newly added or replaced hard disk, so as to perform virtual node migration between hard disks that are corresponding to configured hard disk capacity levels, so that the storage system whose capacity has been expanded may still adequately use storage space of hard disks of different capacities, and meanwhile, performance balance may also be considered.

Figure 5:
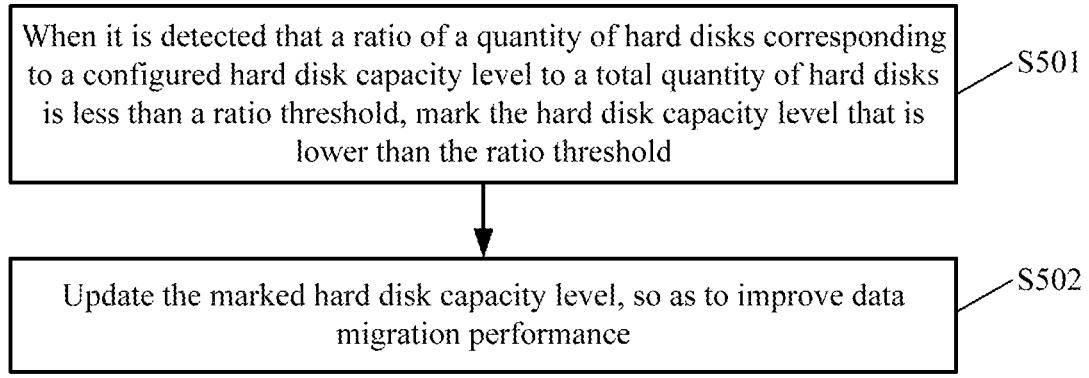
FIG. 5 is a schematic flowchart of one of methods for updating a capacity level according to an embodiment of the present invention.

Referring to FIG. 5, FIG. 5 is a schematic flowchart of one of methods for updating a capacity level according to an embodiment of the present invention, where the method includes:

S501. When it is detected that a ratio of a quantity of hard disks corresponding to a configured hard disk capacity level to a total quantity of hard disks is less than a ratio threshold, mark the hard disk capacity level that is lower than the ratio threshold.

S502. Update the marked hard disk capacity level, so as to improve data migration performance.

Specifically, when it is detected that the ratio of the quantity of the hard disks corresponding to the configured hard disk capacity level to the total quantity of the hard disks is less than the ratio threshold, the hard disk capacity level that is lower than the ratio threshold is marked, and the marked hard disk capacity level is updated, so as to improve the data migration performance. An updating method may be: setting the marked hard disk capacity level to a lower hard disk capacity level again. For example, in a storage system, the ratio threshold may be preset to 20%, that is, when a quantity of hard disks that are corresponding to a hard disk capacity level is less than 20% of a total quantity of all hard disks, a hard disk corresponding to this hard disk capacity level is considered as a low-level hard disk for use. When in the storage system, a quantity of hard disks of 1 TB is 40, a quantity of hard disks of 2 TB is 10, and a quantity of hard disks of 4 TB is 50, a hard disk capacity level corresponding to the hard disk of 2 TB is degraded from a level 2 to a level 1, so as to reduce a system jitter and improve data migration performance. Because hard disk capacity compatibility is mainly compatibility with high-capacity hard disks, hard disks of a small quantity may not be considered.

According to this embodiment of the present invention, by updating a hard disk capacity level that is corresponding to hard disks of a relatively small quantity, such hard disks are considered as low-level hard disks for use, which can reduce a system jitter and improve data migration performance.

Figure 6:
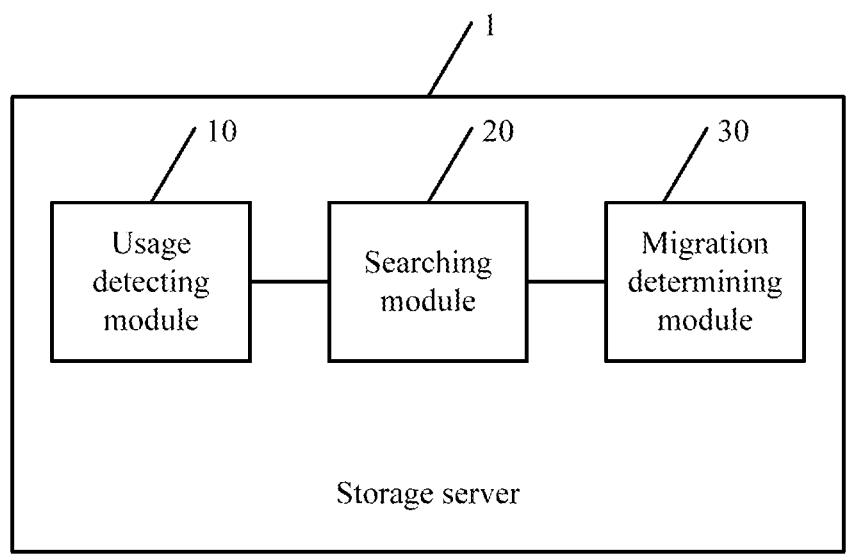
FIG. 6 is a schematic structural diagram of a storage server according to an embodiment of the present invention.

Referring to FIG. 6, FIG. 6 is a schematic structural diagram of a storage server 1 according to an embodiment of the present invention, where the storage server 1 may include a usage detecting module 10, a searching module 20, and a migration determining module 30.

The usage detecting module 10 is configured to detect actual usage of a hard disk corresponding to an initial capacity level in configured hard disk capacity levels, where the hard disk capacity levels are obtained by means of classification according to an actual hard disk capacity.

Specifically, the usage detecting module 10 may detect the actual usage of the hard disk corresponding to the initial capacity level in the configured hard disk capacity levels. The hard disk capacity levels are obtained by means of classification according to the actual hard disk capacity. For example, there are hard disks of three capacities, that is, 1 TB, 2 TB, and 3 TB in a distributed storage system; then, a hard disk capacity level of a hard disk of capacity 1 TB is configured to a level 1, a hard disk capacity level of a hard disk of capacity 2 TB is configured to a level 2, and a hard disk capacity level of a hard disk of capacity 3 TB is configured to a level 3. The initial capacity level is selected from the configured hard disk capacity levels. For example, during system initialization, a minimum hard disk capacity level is selected from the configured hard disk capacity levels as the initial capacity level, that is, in hard disk capacity levels, that is, the level 1 to the level 3, the hard disk capacity level, that is, the level 1, is selected as the initial capacity level. After the initial capacity level is determined, the usage detecting module 10 may detect the actual usage of the hard disk corresponding to the initial capacity level in the configured hard disk capacity levels. For example, if the initial capacity level is the hard disk capacity level, that is, the level 1, the usage detecting module 10 may detect a capacity of stored data in a hard disk corresponding to the hard disk capacity level, that is, the level 1.

The searching module 20 is configured to: when it is determined, according to the actual usage detected by the usage detecting module 10, that the hard disk corresponding to the initial capacity level exceeds a limit, search for a hard disk corresponding to a second highest capacity level that is in the configured hard disk capacity levels and is higher than the initial capacity level.

Specifically, when it is determined, according to the detected actual usage, that the hard disk corresponding to the initial capacity level exceeds the limit, the searching module 20 may search for the hard disk corresponding to the second highest capacity level that is in the configured hard disk capacity levels and is higher than the initial capacity level. For example, when hard disks in a storage system may be classified into a level 1, a level 2, and a level 3, and the initial capacity level is a hard disk capacity level, that is, the level 1, the searching module 20 may obtain, by means of searching, the hard disk corresponding to the second highest capacity level that is in the configured hard disk capacity levels and is higher than the initial capacity level, that is, a hard disk corresponding to the second highest capacity level that is a hard disk capacity level, that is, the level 2.

The migration determining module 30 is configured to: when the hard disk corresponding to the second highest capacity level is obtained by means of searching by the searching module 20, determine a migration ratio of a virtual node according to the initial capacity level, the second highest capacity level, and the actual hard disk capacity, and perform, according to the migration ratio, virtual node migration between hard disks that are corresponding to the configured hard disk capacity levels, where the virtual node carries stored data.

Specifically, when the searching module 20 obtains, by means of searching, the hard disk corresponding to the second highest capacity level, the migration determining module 30 may determine the migration ratio of the virtual node according to the initial capacity level, the second highest capacity level, and the actual hard disk capacity, and perform, according to the migration ratio, the virtual node migration between the hard disks that are corresponding to the configured hard disk capacity levels, where the virtual node carries the stored data. That is, the migration determining module 30 migrates a virtual node that is on a hard disk of a low hard disk capacity level and carries the stored data to a hard disk of a high hard disk capacity level, so that the virtual node and data stored on the virtual node may be migrated at the same time. The migrated data may still be mapped to the original corresponding virtual node, so that the migrated data may continue to be normally stored and retrieved. The migration determining module 30 migrates the virtual node on the hard disk of the low hard disk capacity level and the data stored on the virtual node to the hard disk of the high hard disk capacity level, which can reduce storage load of the hard disk of the low hard disk capacity level and adequately use storage space of the hard disk of the high hard disk capacity level. In addition, the hard disk of the high hard disk capacity level may have more virtual nodes to share more storage work, so that performance balance can be improved, and further, storage space of a hard disk of a large capacity can be adequately used.

For example, hard disk capacity levels in a storage system include a level 1, a level 2, and a level 3, actual hard disk capacities are respectively 1 TB, 2 TB, and 3 TB, and quantities of hard disks corresponding to the hard disk capacity levels are the same. During system initialization, 48 virtual nodes are allocated to hard disks corresponding to each hard disk capacity level, and the initial capacity level is a hard disk capacity level, that is, the level 1. When hard disks corresponding to the initial capacity level exceed a limit, a hard disk capacity level, that is, the level 2, is used as the second highest capacity level, and the migration determining module 30 may determine the migration ratio of the virtual node according to the initial capacity level and the second highest capacity level, that is, a migration ratio of hard disks that are corresponding to the hard disk capacity levels, that is, the level 1, the level 2, and the level 3, is 1:2:2. A quantity of virtual nodes that are obtained by a hard disk of a hard disk capability level higher than the second highest capacity level is the same as a quantity of virtual nodes that are obtained by the hard disk of the second highest capacity level. In this case, the migration determining module 30 migrates, according to the migration ratio of 1:2:2, virtual nodes on the hard disks corresponding to the level 1 to the hard disks of the level 2 and the level 3. Because each virtual node carries data of a same size, after the virtual node migration ends, a size ratio of data that is stored in the hard disks corresponding to the level 1, the level 2, and the level 3 is also 1:2:2. In this case, a quantity of virtual nodes on the hard disks corresponding to the level 1 is 29, a quantity of virtual nodes on the hard disks corresponding to the level 2 is 57, and a quantity of virtual nodes on the hard disks corresponding to the level 3 is 58.

According to this embodiment of the present invention, different hard disk capacity levels are obtained by means of classification according to an actual hard disk capacity, and when a hard disk corresponding to an initial capacity level exceeds a limit, a virtual node that is on each hard disk and carries stored data is migrated, so that hard disk capacity heterogeneousness in massive storage can be supported, and meanwhile, storage space of hard disks of different capacities can also be adequately used because data on a virtual node is migrated according to a migration ratio. In addition, a hard disk of a high level may have more virtual nodes to share more storage work, so that performance balance can be improved, and further, storage space of a hard disk of a large capacity can be adequately used.

Figure 7:
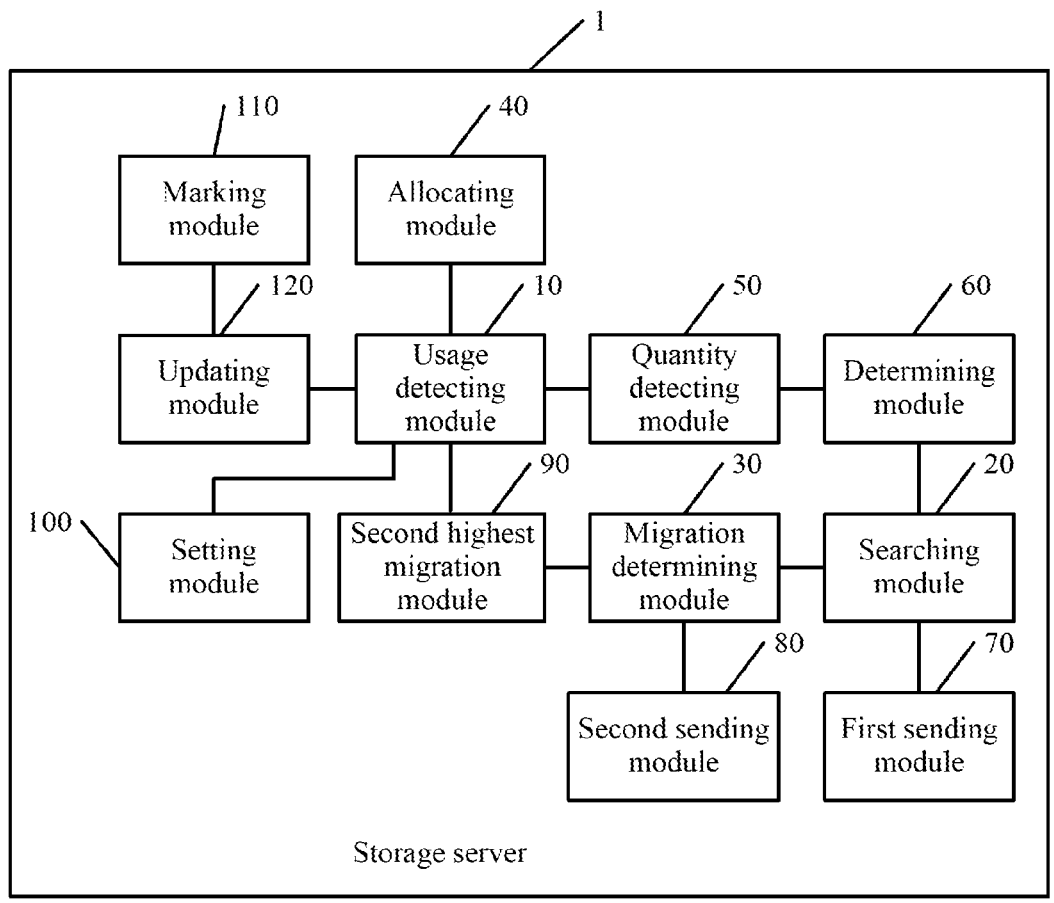
FIG. 7 is a schematic structural diagram of another storage server according to an embodiment of the present invention.

Referring to FIG. 7, FIG. 7 is a schematic structural diagram of another storage server 1 according to an embodiment of the present invention, where the storage server 1 may include an allocating module 40, a usage detecting module 10, a quantity detecting module 50, a determining module 60, a searching module 20, a first sending module 70, a migration determining module 30, a second highest migration module 90, a second sending module 80, a setting module 100, a marking module 110, and an updating module 120.

The allocating module 40 is configured to: during system initialization, allocate virtual nodes of a same quantity to hard disks corresponding to configured hard disk capacity levels.

Specifically, during the system initialization, the allocating module 40 may allocate the virtual nodes of the same quantity to the hard disks corresponding to the configured hard disk capacity levels, so that data interfaces between heterogeneous hard disks are balanced among nodes to a greatest extent. The virtual node is used to manage stored data.

The usage detecting module 10 is configured to detect actual usage of a hard disk corresponding to an initial capacity level in the configured hard disk capacity levels, where the hard disk capacity levels are obtained by means of classification according to an actual hard disk capacity.

Specifically, the usage detecting module 10 may detect the actual usage of the hard disk corresponding to the initial capacity level in the configured hard disk capacity levels. The hard disk capacity levels are obtained by means of classification according to the actual hard disk capacity. For example, there are hard disks of three capacities, that is, 1 TB, 2 TB, and 3 TB in a distributed storage system; then, a hard disk capacity level of a hard disk of capacity 1 TB is configured to a level 1, a hard disk capacity level of a hard disk of capacity 2 TB is configured to a level 2, and a hard disk capacity level of a hard disk of capacity 3 TB is configured to a level 3. The initial capacity level is selected from the configured hard disk capacity levels. For example, during the system initialization, a minimum hard disk capacity level is selected from the configured hard disk capacity levels as the initial capacity level, that is, in hard disk capacity levels, that is, the level 1 to the level 3, the hard disk capacity level, that is, the level 1, is selected as the initial capacity level. After the initial capacity level is determined, the usage detecting module 10 may detect the actual usage of the hard disk corresponding to the initial capacity level in the configured hard disk capacity levels. For example, if the initial capacity level is the hard disk capacity level, that is, the level 1, the usage detecting module 10 may detect a capacity of stored data in a hard disk corresponding to the hard disk capacity level, that is, the level 1.

The quantity detecting module 50 is configured to detect whether a quantity of hard disks that are corresponding to the initial capacity level and whose actual usage exceeds a preset usage threshold reaches a preset quantity threshold.

The determining module 60 is configured to: if it is detected that the quantity of the hard disks reaches the quantity threshold, determine that the hard disk corresponding to the initial capacity level exceeds a limit.

When the quantity detecting module 50 detects that the quantity of the hard disks that are corresponding to the initial capacity level and whose actual usage exceeds the preset usage threshold reaches the preset quantity threshold, the determining module 6*o* may determine that the hard disk corresponding to the initial capacity level exceeds the limit. For example, the initial capacity level is the hard disk capacity level, that is, the level 1, a quantity of hard disks corresponding to the hard disk capacity level, that is, the level 1, is 10, the usage threshold is 50% of a hard disk capacity, and the quantity threshold is 80% of a quantity of hard disks that are corresponding to a hard disk capacity level; and when the quantity detecting module 50 detects that a quantity of hard disks whose actual usage exceeds 50% of the hard disk capacity reaches 8, the determining module 60 may determine that the hard disk corresponding to the initial capacity level exceeds the limit.

The searching module 20 is configured to: when it is determined, according to the actual usage detected by the usage detecting module 10, that the hard disk corresponding to the initial capacity level exceeds the limit, search for a hard disk corresponding to a second highest capacity level that is in the configured hard disk capacity levels and is higher than the initial capacity level.

Specifically, when it is determined, according to the detected actual usage, that the hard disk corresponding to the initial capacity level exceeds the limit, the searching module 20 may search for the hard disk corresponding to the second highest capacity level that is in the configured hard disk capacity levels and is higher than the initial capacity level. For example, when hard disks in a storage system may be classified into a level 1, a level 2, and a level 3, and the initial capacity level is a hard disk capacity level, that is, the level 1, the searching module 20 may obtain, by means of searching, the hard disk corresponding to the second highest capacity level that is in the configured hard disk capacity levels and is higher than the initial capacity level, that is, a hard disk corresponding to the second highest capacity level that is a hard disk capacity level, that is, the level 2.

The first sending module 70 is configured to: when the second highest capacity level that is in the configured hard disk capacity levels and is higher than the initial capacity level is not obtained by means of searching, send expansion prompt information.

Specifically, when the searching module 20 does not obtain, by means of searching, the second highest capacity level that is in the configured hard disk capacity levels and is higher than the initial capacity level, it indicates that the hard disk corresponding to the initial capacity level is a highest level in the hard disk capacity levels. To enable a storage system to continue to store data, expansion may be performed, that is, the first sending module 70 may send the expansion prompt information to a terminal of an administrator, so as to prompt the administrator to expand a capacity of the storage system.

The migration determining module 30 is configured to: when the hard disk corresponding to the second highest capacity level is obtained by means of by the searching module 20, determine a migration ratio of a virtual node according to the initial capacity level, the second highest capacity level, and the actual hard disk capacity, and perform, according to the migration ratio, virtual node migration between hard disks that are corresponding to the configured hard disk capacity levels, where the virtual node carries the stored data.

The second highest migration module 90 is configured to use the second highest capacity level as the initial capacity level to perform virtual node migration.

Specifically, when the searching module 20 obtains, by means of searching, the hard disk corresponding to the second highest capacity level, the migration determining module 30 may determine the migration ratio of the virtual node according to the initial capacity level, the second highest capacity level, and the actual hard disk capacity, and perform, according to the migration ratio, the virtual node migration between the hard disks that are corresponding to the configured hard disk capacity levels, where the virtual node carries the stored data. That is, the migration determining module 30 migrates a virtual node that is on a hard disk of a low hard disk capacity level and carries the stored data to a hard disk of a high hard disk capacity level, so that the virtual node and data stored on the virtual node may be migrated at the same time. The migrated data may still be mapped to the original corresponding virtual node, so that the migrated data may continue to be normally stored and retrieved. The migration determining module 30 migrates the virtual node on the hard disk of the low hard disk capacity level and the data stored on the virtual node to the hard disk of the high hard disk capacity level, which can reduce storage load of the hard disk of the low hard disk capacity level and adequately use storage space of the hard disk of the high hard disk capacity level. In addition, the hard disk of the high hard disk capacity level may have more virtual nodes to share more storage work, so that performance balance can be improved, and further, storage space of a hard disk of a large capacity can be adequately used.

For example, hard disk capacity levels in a storage system include a level 1, a level 2, and a level 3, actual hard disk capacities are respectively 1 TB, 2 TB, and 3 TB, and quantities of hard disks corresponding to the hard disk capacity levels are the same. During the system initialization, 48 virtual nodes are allocated to hard disks corresponding to each hard disk capacity level, and the initial capacity level is a hard disk capacity level, that is, the level 1. When hard disks corresponding to the initial capacity level exceed a limit, a hard disk capacity level, that is, the level 2, is used as the second highest capacity level, and the migration determining module 30 may determine the migration ratio of the virtual node according to the initial capacity level and the second highest capacity level, that is, a migration ratio of hard disks that are corresponding to the hard disk capacity levels, that is, the level 1, the level 2, and the level 3, is 1:2:2. A quantity of virtual nodes that are obtained by a hard disk of a hard disk capability level higher than the second highest capacity level is the same as a quantity of virtual nodes that are obtained by the hard disk of the second highest capacity level. In this case, the migration determining module 30 migrates, according to the migration ratio of 1:2:2, virtual nodes on the hard disks corresponding to the level 1 to the hard disks of the level 2 and the level 3. Because each virtual node carries data of a same size, after the virtual node migration ends, a size ratio of data that is stored in the hard disks corresponding to the level 1, the level 2, and the level 3 is also 1:2:2. In this case, a quantity of virtual nodes on the hard disks corresponding to the level 1 is 29, a quantity of virtual nodes on the hard disks corresponding to the level 2 is 57, and a quantity of virtual nodes on the hard disks corresponding to the level 3 is 58. After the virtual node migration is completed, the second highest migration module 90 may further use the second highest capacity level as the initial capacity level to perform virtual node migration, that is, when the hard disks corresponding to the hard disk capacity level, that is, the level 2, exceed a limit, the migration determining module 30 may determine that a migration ratio of virtual nodes of the hard disks of the level 1 to the level 3 is 1:2:3, so that after the virtual node migration ends, the ratios of the size of the data that is stored on the hard disks corresponding to the level 1 to the level 3 and the quantity of the virtual nodes are both 1:2:3, that is, a quantity of the virtual nodes on the hard disks corresponding to the level 1 is 24, a quantity of the virtual nodes on the hard disks corresponding to the level 2 is 48, and a quantity of the virtual nodes on the hard disks corresponding to the level 3 is 64.

The second sending module 80 is configured to: when the hard disk corresponding to the second highest capacity level exceeds a limit and the second highest capacity level is a highest hard disk capacity level in the configured levels, send the expansion prompt information.

Specifically, when the hard disk corresponding to the second highest capacity level exceeds the limit and the second highest capacity level is not the highest hard disk capacity level in the configured levels, the second highest migration module 90 may use the second highest capacity level as the initial capacity level to perform virtual node migration. When the hard disk corresponding to the second highest capacity level exceeds the limit and the second highest capacity level is the highest hard disk capacity level in the configured levels, it indicates that in a storage system, a hard disk corresponding to a hard disk capacity level higher than the second highest capacity level does not exist. To enable the storage system to continue to normally work, expansion is required, that is, the second sending module 80 may send the expansion prompt information to a terminal of an administrator, so as to prompt the administrator to expand a capacity of the storage system.

The setting module 100 is configured to: during expansion or hard disk replacement, set a corresponding hard disk capacity level for a newly added or replaced hard disk, so as to perform the virtual node migration between the hard disks that are corresponding to the configured hard disk capacity levels.

Specifically, during the expansion or the hard disk replacement, the setting module 100 may set the corresponding hard disk capacity level for the newly added or the replaced hard disk, so as to perform the virtual node migration between the hard disks that are corresponding to the configured hard disk capacity levels. For example, in a storage system, there are hard disks of capacities, that is, 1 TB, 2 TB, and 3 TB, where corresponding hard disk capacity levels of the hard disks are respectively a level 1, a level 2, and a level 3, and a current initial capacity level is a hard disk capacity level, that is, the level 3. When hard disks corresponding to the initial capacity level exceed a limit and a hard disk of capacity 4 TB is added, the hard disk of capacity 4 TB is set to a hard disk capacity level, that is, a level 4, and the migration determining module 30 performs, according to a migration ratio of 1:2:3:4, virtual node migration between hard disks that are corresponding to the hard disk capacity levels, that is, the level 1 to the level 4. When hard disks corresponding to the initial capacity level do not exceed a limit and a hard disk of capacity 4 TB is added, the setting module 100 sets a hard disk of capacity 4 TB to a hard disk capacity level, that is, a level 4, and the migration determining module 30 performs, according to a migration ratio of 1:2:3:3, virtual node migration between hard disks that are corresponding to the hard disk capacity levels, that is, the level 1 to the level 4. During the expansion and the hard disk replacement, migration of a virtual node that carries stored data may enable the storage system to continue to normally store data.

The marking module 110 is configured to: when it is detected that a ratio of a quantity of hard disks corresponding to a configured hard disk capacity level to a total quantity of hard disks is less than a ratio threshold, mark the hard disk capacity level that is lower than the ratio threshold.

The updating module 120 is configured to update the marked hard disk capacity level, so as to improve data migration performance.

Specifically, when it is detected that the ratio of the quantity of the hard disks corresponding to the configured hard disk capacity level to the total quantity of the hard disks is less than the ratio threshold, the marking module 110 may mark the hard disk capacity level that is lower than the ratio threshold, and the updating module 120 updates the marked hard disk capacity level, so as to improve the data migration performance. An updating method may be: setting the marked hard disk capacity level to a lower hard disk capacity level again. For example, in a storage system, the ratio threshold may be preset to 20%. When a quantity of hard disks that are corresponding to a hard disk capacity level is less than 20% of a total quantity of all hard disks, the marking module 110 marks the hard disk capacity level, and the updating module 120 sets the marked hard disk capacity level to a lower hard disk capacity level, that is, a hard disk corresponding to this hard disk capacity level is considered as a low-level hard disk for use. When in the storage system, a quantity of hard disks of 1 TB is 40, a quantity of hard disks of 2 TB is 10, and a quantity of hard disks of 4 TB is 50, the marking module 110 may mark a hard disk capacity level corresponding to the hard disks of 2 TB, and the updating module 120 degrades the marked hard disk capacity level from a level 2 to a level 1, that is, a hard disk of 2 TB is considered as a hard disk of 1 TB for use, so as to reduce a system jitter and improve data migration performance. Because hard disk capacity compatibility is mainly compatibility with high-capacity hard disks, hard disks of a small quantity may not be considered.

Figure 8:
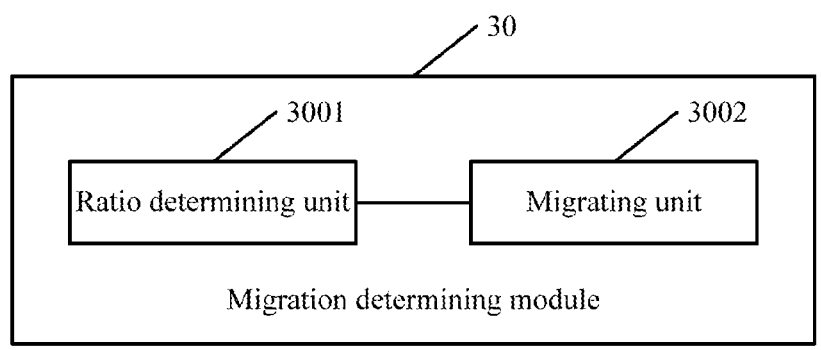
FIG. 8 is a schematic structural diagram of a migration determining module according to an embodiment of the present invention.

Further, referring to FIG. 8, FIG. 8 is a schematic structural diagram of a migration determining module 30 according to an embodiment of the present invention, where the migration determining module 30 includes a ratio determining unit 3001 and a migrating unit 3002.

The ratio determining unit 3001 is configured to: when the hard disk corresponding to the second highest capacity level is obtained by means of searching by the searching module 20, determine the migration ratio of the virtual node according to the initial capacity level, the second highest capacity level, and the actual hard disk capacity.

The migrating unit 3002 is configured to migrate, according to the migration ratio, the virtual node from a hard disk corresponding to a hard disk capacity level lower than the second highest capacity level to a hard disk corresponding to a hard disk capacity level higher than or equal to the second highest capacity level, where the virtual node carries the stored data.

Specifically, when the searching module 20 obtains, by means of searching, the hard disk corresponding to the second highest capacity level, the ratio determining unit 3001 may determine the migration ratio of the virtual node according to the initial capacity level, the second highest capacity level, and the actual hard disk capacity. The migrating unit 3002 may migrate, according to the migration ratio, the virtual node from the hard disk corresponding to the hard disk capacity level lower than the second highest capacity level to the hard disk corresponding to the hard disk capacity level higher than or equal to the second highest capacity level, so that the migrating unit 3002 may migrate the virtual node and data stored on the virtual node at the same time. The migrated data may still be mapped to the original corresponding virtual node, so that the migrated data may continue to be normally stored and retrieved. The migrating unit 3002 migrates the virtual node on the hard disk of the low level and the data stored on the virtual node to the hard disk of the high level, which can reduce storage load of the hard disk of the low level and adequately use storage space of the hard disk of the high level. In addition, the hard disk of the high level may have more virtual nodes to share more storage work, so that performance balance can be improved, and further, storage space of a hard disk of a large capacity can be adequately used.

According to this embodiment of the present invention, different hard disk capacity levels are obtained by means of classification according to an actual hard disk capacity, and when a hard disk corresponding to an initial capacity level exceeds a limit, a virtual node that is on each hard disk and carries stored data is migrated, so that hard disk capacity heterogeneousness in massive storage can be supported, and meanwhile, storage space of hard disks of different capacities can also be adequately used because data on a virtual node is migrated according to a migration ratio. In addition, a hard disk of a high level may have more virtual nodes to share more storage work, so that performance balance can be improved, and further, storage space of a hard disk of a large capacity can be adequately used.

A person of ordinary skill in the art may understand that all or some of the processes of the methods in the foregoing embodiments may be implemented by a computer program instructing relevant hardware. The program may be stored in a computer-readable storage medium. When the program runs, the processes of the methods in the foregoing embodiments are performed. The storage medium may include: a magnetic disk, an optical disc, a read-only memory (ROM), or a random access memory (RAM).

What is disclosed above is merely exemplary embodiments of the present invention, but is not intended to limit the protection scope of the present invention. Therefore, equivalent variations made based on the claims of the present invention also shall fall within the scope of the present invention.

What is claimed is:

1. A data storage method comprising:
   detecting actual usage of a hard disk corresponding to an initial capacity level in configured hard disk capacity levels, wherein the hard disk capacity levels are obtained by a classification according to an actual hard disk capacity, wherein a plurality of virtual nodes is allocated to each of the hard disk capacity levels;
   when it is determined, according to the detected actual usage, that the hard disk corresponding to the initial capacity level exceeds a limit, searching for a hard disk corresponding to a capacity level that is in the configured hard disk capacity levels and is immediately higher than the initial capacity level; and
   when the hard disk corresponding to the immediately higher capacity level is obtained by searching, determining a migration ratio of a virtual node according to the initial capacity level, the immediately higher capacity level, and the actual hard disk capacity, and performing, according to the migration ratio, virtual node migration between hard disks that are corresponding to the configured hard disk capacity levels, wherein the virtual node carries stored data.

2. The method according to claim 1, before the detecting actual usage of a hard disk corresponding to an initial capacity level in configured hard disk capacity levels, further comprising:
   during system initialization, allocating virtual nodes of a same quantity to the hard disks that are corresponding to the configured hard disk capacity levels, wherein the virtual node is used to manage the stored data.

3. The method according to claim 1, after the detecting actual usage of a hard disk corresponding to an initial capacity level in configured hard disk capacity levels, further comprising:
   detecting whether a quantity of hard disks that are corresponding to the initial capacity level and whose actual usage exceeds a preset usage threshold reaches a preset quantity threshold; and
   if it is detected that the quantity of the hard disks reaches the quantity threshold, determining that the hard disk corresponding to the initial capacity level exceeds the limit.

4. The method according to claim 1, wherein the step of when the hard disk corresponding to the immediately higher capacity level is obtained by searching, determining a migration ratio of a virtual node according to the initial capacity level, the immediately higher capacity level, and the actual hard disk capacity, and performing, according to the migration ratio, virtual node migration between hard disks that are corresponding to the configured hard disk capacity levels, wherein the virtual node carries stored data comprises:

when the hard disk corresponding to the immediately higher capacity level is obtained by searching, determining the migration ratio of the virtual node according to the initial capacity level, the immediately higher capacity level, and the actual hard disk capacity; and migrating, according to the migration ratio, the virtual node from a hard disk corresponding to a hard disk capacity level lower than the immediately higher capacity level to a hard disk corresponding to a hard disk capacity level higher than or equal to the immediately higher capacity level, wherein the virtual node carries the stored data.

5. The method according to claim 1, further comprising: when the capacity level that is in the configured hard disk capacity levels and is immediately higher than the initial capacity level is not obtained by searching, sending expansion prompt information.

6. The method according to claim 1, further comprising: when the hard disk corresponding to the immediately capacity level exceeds a limit and the immediately higher capacity level is a highest hard disk capacity level in the configured levels, sending the expansion prompt information.

7. The method according to claim 1, further comprising: during expansion or hard disk replacement, setting a corresponding hard disk capacity level for a newly added or replaced hard disk, so as to perform the virtual node migration between the hard disks that are corresponding to the configured hard disk capacity levels.

8. The method according to claim 1, further comprising: when it is detected that a ratio of a quantity of hard disks corresponding to a configured hard disk capacity level to a total quantity of hard disks is less than a ratio threshold, marking the hard disk capacity level that is lower than the ratio threshold; and updating the marked hard disk capacity level, so as to improve data migration performance.

9. A storage server comprising:
a processor;
a memory storing a program, the program comprising instructions for
detecting actual usage of a hard disk corresponding to an initial capacity level in configured hard disk capacity levels, wherein the hard disk capacity levels are obtained by classification according to an actual hard disk capacity, wherein a plurality of virtual nodes is allocated to each of the hard disk capacity levels;
when it is determined, according to the actual usage, that the hard disk corresponding to the initial capacity level exceeds a limit, searching for a hard disk corresponding to a capacity level that is in the configured hard disk capacity levels and is immediately higher than the initial capacity level; and
when the hard disk corresponding to the immediately higher capacity level is obtained by searching, determining a migration ratio of a virtual node according to the initial capacity level, the second highest capacity level, and the actual hard disk capacity, and perform, according to the migration ratio, virtual node migration between hard disks that are corresponding to the configured hard disk capacity levels, wherein the virtual node carries stored data.

10. The storage server according to claim 9, wherein the program further comprises instructions for:
during system initialization, allocating virtual nodes of a same quantity to the hard disks that are corresponding to the configured hard disk capacity levels;
wherein the virtual node is used to manage the stored data.

11. The storage server according to claim 9, wherein the program further comprises instructions for:
detecting whether a quantity of hard disks that are corresponding to the initial capacity level and whose actual usage exceeds a preset usage threshold reaches a preset quantity threshold; and
if it is detected that the quantity of the hard disks reaches the quantity threshold, determining that the hard disk corresponding to the initial capacity level exceeds the limit.

12. The storage server according to claim 9, wherein the instructions for determining the migration ratio and performing the virtual node migration comprises further instructions for:
when the hard disk corresponding to the immediately higher capacity level is obtained by searching by the searching module, determining the migration ratio of the virtual node according to the initial capacity level, the immediately higher capacity level, and the actual hard disk capacity; and
migrating, according to the migration ratio, the virtual node from a hard disk corresponding to a hard disk capacity level lower than the immediately higher capacity level to a hard disk corresponding to a hard disk capacity level higher than or equal to the immediately higher capacity level, wherein the virtual node carries the stored data.

13. The storage server according to claim 9, wherein the program further comprises instructions for:
when the immediately higher capacity level that is in the configured hard disk capacity levels and is higher than the initial capacity level is not obtained by searching, sending expansion prompt information.

14. The storage server according to claim 9, wherein the program further comprises instructions for:
when the hard disk corresponding to the immediately higher capacity level exceeds a limit and the immediately higher capacity level is a highest hard disk capacity level in the configured levels, sending the expansion prompt information.

15. The storage server according to claim 9, a second sending module, configured to:
during expansion or hard disk replacement, setting a corresponding hard disk capacity level for a newly added or replaced hard disk, so as to perform the virtual node migration between the hard disks that are corresponding to the configured hard disk capacity levels.

16. The storage server according to claim 9, a second sending module, configured to:
when it is detected that a ratio of a quantity of hard disks corresponding to a configured hard disk capacity level to a total quantity of hard disks is less than a ratio threshold, marking the hard disk capacity level that is lower than the ratio threshold; and
updating the marked hard disk capacity level, so as to improve data migration performance.

17. A storage server comprising:

means for detecting actual usage of a hard disk corresponding to an initial capacity level in configured hard disk capacity levels, wherein the hard disk capacity levels are obtained by a classification according to an actual hard disk capacity, wherein a plurality of virtual nodes is allocated to each of the hard disk capacity levels;

when it is determined, according to the detected actual usage, that the hard disk corresponding to the initial capacity level exceeds a limit, means for searching for a hard disk corresponding to a immediately higher capacity level that is in the configured hard disk capacity levels and is immediately higher than the initial capacity level; and when the hard disk corresponding to the immediately higher capacity level is obtained by searching, means for determining a migration ratio of a virtual node according to the initial capacity level, the immediately higher capacity level, and the actual hard disk capacity, and performing, according to the migration ratio, virtual node migration between hard disks that are corresponding to the configured hard disk capacity levels, wherein the virtual node carries stored data.

* * * * *